United States Patent [19]

Paton, III

[11] 4,083,343

[45] Apr. 11, 1978

[54] FUEL VAPORIZER

[76] Inventor: John W. Paton, III, 304 Main St., Franklin, Ill. 63628

[21] Appl. No.: 732,099

[22] Filed: Oct. 13, 1976

Related U.S. Application Data

[63] Continuation of Ser. No. 573,899, May 2, 1975, abandoned.

[51] Int. Cl.² .................................... F02M 31/00
[52] U.S. Cl. ........................... 123/124 R; 123/122 D; 123/127; 123/119 D; 261/145; 261/63
[58] Field of Search .......... 123/124 R, 122 D, 119 D; 261/63 A, 23 A, 145; 48/180 A

[56] References Cited

U.S. PATENT DOCUMENTS

| 1,221,536 | 4/1917 | Hopkins | 123/124 R |
| 1,333,558 | 3/1920 | Minor | 123/124 R |
| 1,344,615 | 6/1920 | Brostrom | 123/122 D |
| 1,544,801 | 7/1925 | Brown | 123/124 R |
| 2,152,028 | 3/1939 | Church | 123/122 D |
| 3,310,045 | 3/1967 | Bartholemew | 123/127 |
| 3,887,661 | 6/1975 | Gala | 261/63 |

Primary Examiner—Ronald H. Lazarus
Attorney, Agent, or Firm—Grace J. Fishel

[57] ABSTRACT

A means for improving vaporization of a carbureted mixture by the addition of uncombusted heated air, which means is interposed between the carburetor and the intake manifold of an internal combustion engine to aid in breaking up and vaporizing the fuel for more complete combustion thereof.

10 Claims, 8 Drawing Figures

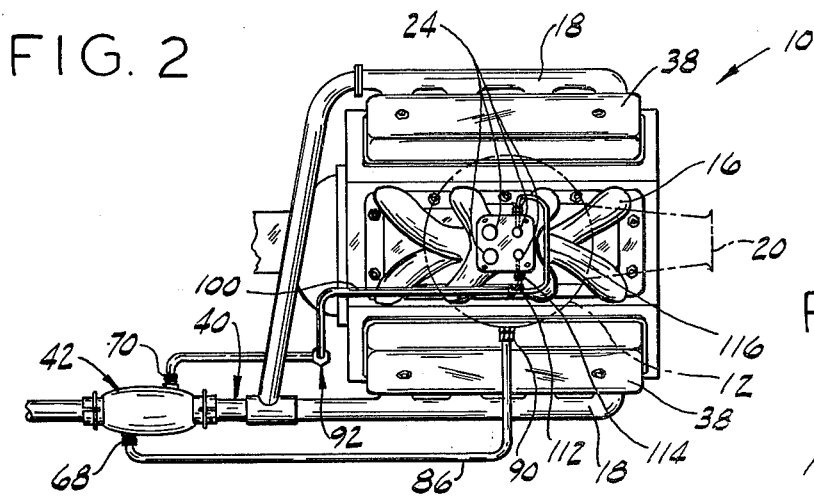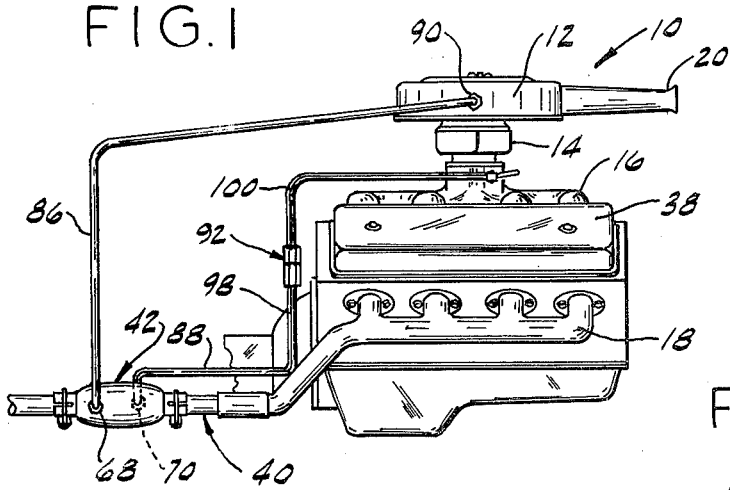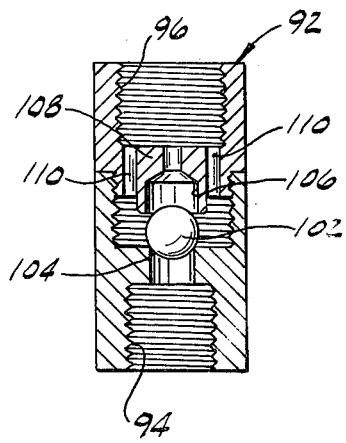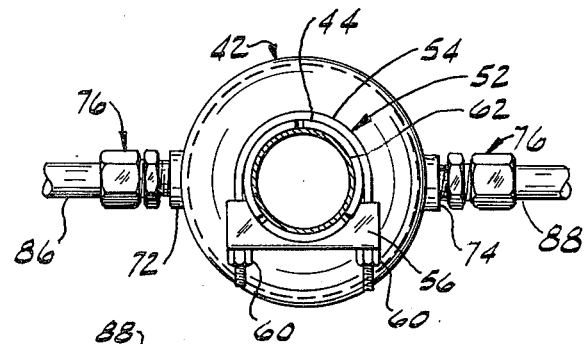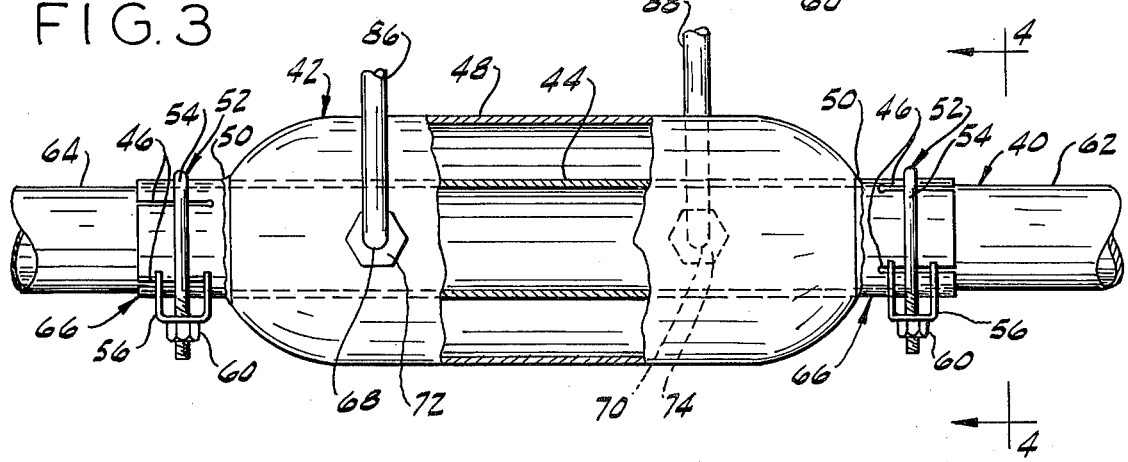

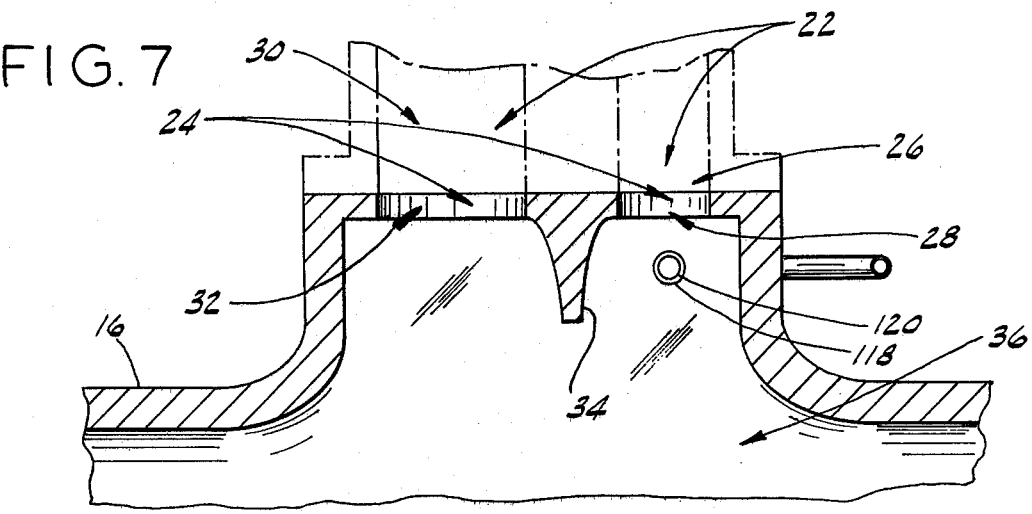
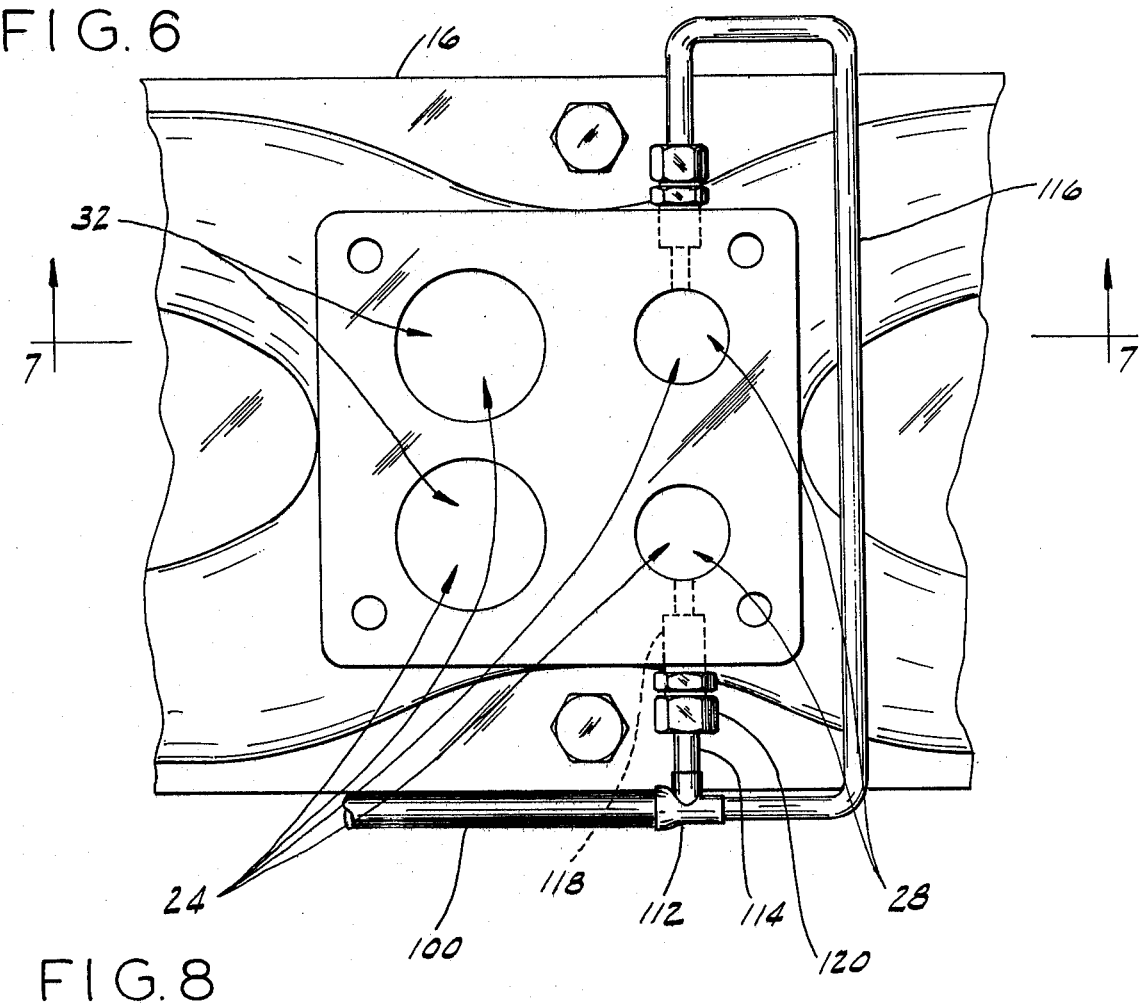
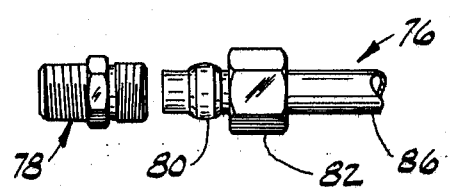

FUEL VAPORIZER

This is a continuation of application Ser. No. 573,899, filed May 2, 1975 now abandoned.

This invention relates to a means for vaporizing the air/fuel combustion mixture.

A carburetor atomizes and vaporizes fuel and mixes it with air in varying proportions to suit the changing operating conditions of an engine.

The ideal carburetor would pass a mixture of completely vaporized fuel and air in the proper proportion to the intake manifold and cylinders. Complete vaporization of the fuel is not achieved in present-day carburetors, however, because of the varying composition of the fuel and other limitations. Moreover, no matter how well mixed and vaporized the fuel mixture may be as it leaves the carburetor, its characteristics are changed as it passes through the manifold. Cold surfaces in the manifold will cause some of the vaporized fuel to condense, and changes in direction of flow will, through inertia, cause some portions of the mixture to settle out.

Many devices have been proposed to aid the carburetor in breaking up and vaporizing the fuel by heating either the carburetor or the intake manifold. Some of these devices have included means for bringing exhaust gases from the exhaust manifold to the carburetor or to the intake manifold, hot water jackets surrounding the carburetor or the intake manifold, electrical heaters in the carburetor and so forth. None of these devices has been entirely satisfactory, however, because vaporization of all the gasoline is usually still incomplete until the end of the compression stroke in the cylinder. Combustion is, therefore, incomplete resulting in lower engine efficiency and higher amounts of exhaust pollutants. Many of these devices are also expensive, difficult to install, ineffective or similarly unsatisfactory.

Among the several objects of the present invention may be noted the provision of means for vaporizing a carbureted mixture by the addition thereto of uncombusted heated air, which means increases the proportion of air in the carbureted mixture and thereby also enhances fuel combustion and engine efficiency and reduces the amount of air pollution and which is inexpensive, easy to install and effective. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a side elevational view of a V-8 engine equipped with a fuel vaporizer;

FIG. 2 is a top plan view of the V-8 engine shown in FIG. 1 but with the air cleaner and carburetor removed;

FIG. 3 is a side elevational view of a heat exchanger, partially broken away to show structural details;

FIG. 4 is an end view of the heat exchanger taken along line 4—4 in FIG. 3;

FIG. 5 is a side elevational view in cross-section of a check valve;

FIG. 6 is an enlarged top plan view of the V-8 engine shown in FIG. 2, partially broken away to show the intake manifold inlets;

FIG. 7 is a side elevational view taken along line 7—7 in FIG. 6; and

FIG. 8 is a side elevational view of a compression fitting.

Corresponding reference characters indicate corresponding parts throughout the several views of the drawings.

Reference numeral 10 refers to a V-8 internal combustion engine with an air cleaner 12, a carburetor 14, an intake manifold 16, and an exhaust manifold 18 of a conventional type. Carburetor 14 is of a downdraft type although in other variations in the design and construction of the present fuel vaporizer, the carburetor may be of the updraft or sidedraft type.

Carburetor 14 receives air through an air scoop 20 connected to air cleaner 12 which is mounted on top of the carburetor while gasoline is fed to the carburetor by a conventional fuel pump (not shown). Both air and gasoline are drawn through carburetor 14 and atomized therein by suction created by the pistons moving downward in the engine cylinders. The amount and ratio of the air/fuel combustion mixture is regulated by several means including conventional valves (not shown) in response to movements of an accelerator pedal (not shown).

More particularly as shown, carburetor 14 is a four-barrel carburetor with four induction passages or outlets 22 for register with four bores or inlets 24 in intake manifold 16. Each barrel of carburetor 14 is basically a separate carburetor with a separate throttle or main butterfly valve (not shown), choke valve (not shown) and so forth. Usually, however, there is only one float system (not shown) associated with carburetor 14 and connected to the fuel pump.

In the particular construction shown, half of carburetor 14 operates as a two-barrel or two-throat unit during light load and cruising speeds, while the other half is supplemental for top speed and full-throttle operation. The two barrels supplying fuel for light load operation are usually known as the primary side, while the other two barrels are known as the secondary side.

Under normal conditions, a carbureted mixture is passed through primary carburetor outlets 26 below the main butterfly or throttle valves associated with the primary side into primary inlets 28 of intake manifold 16 while the secondary throttle valves remain closed. As engine speed increases, the throttle plates of the secondary barrels are opened by a mechanical linkage (not shown), a vacuum-operated diaphragm (not shown) or the like so that a carbureted mixture is also passed through secondary carburetor outlets 30 below the throttle valves associated with the secondary side into secondary inlets 32 of intake manifold 16.

In carburetor 14, as used on V-8 engine 10, one pair of primary and secondary barrels supply cylinders 1-7-4-6, while the other pair of primary and secondary barrels supply the air/fuel combustion mixture to cylinders 3-5-2-8 when the engine has a firing order of 1-8-4-3-6-5-7-2. In general, in other constructions utilizing either a four-barrel or two-barrel carburetor, manifolding is designed so that one side of the carburetor will supply the end cylinders on one side of the engine, and the two center cylinders on the other side. The other half of the carburetor will then supply the air/fuel combustion mixture to the remaining cylinders.

As best seen in FIG. 7, there is a web or plate 34 extending partly into an intake manifold cavity or chamber 36 separating primary inlets 28 and secondary inlets 32 but permitting mixing of the carbureted mixture supplied from both the primary and secondary barrels. Inlets 28 and 32 direct the carbureted air/fuel combustion mixture down into manifold chamber 36, the lower portion of which is connected to eight, four on a side runners 38 leading to the individual cylinders.

Manifold 18 leads from the cylinders, separate halves of which are best seen in FIGS. 1 and 2 bolted on each side of the cylinder block. The separate halves of exhaust manifold 18 discharge into a common exhaust pipe 40.

A heat exchanger 42 is shown as inserted into exhaust pipe 40. This device, as best seen in FIG. 3, includes a pipe 44 with slots or notches 46 at opposite ends for use as described hereinafter. Heat exchanger 42 also includes a jacket 48 which is sealed at opposite ends thereof to pipe 44 by welds 50. Sealed jacket 48 is formed of an elongated cylinder which is generally circular in cross-section and constricted at its opposite ends into sealed engagement with pipe 44 which is passes therethrough.

Heat exchanger 42 is secured to right and left segments 62 and 64, respectively, (as viewed in FIG. 3) of exhaust pipe 40 by means of exhaust pipe clamps 52. These clamps 52 include a U-shaped member 54, the legs of which are threaded, a yoke 56 with holes (not shown) adapted to be slipped over the legs of U-shaped member 54, and a pair of nuts 60 adapted to be threadedly received on said legs. Pipe 44 extends beyond jacket 48 and is slippingly received over the ends of right and left segments 62 and 64 of exhaust pipe 40. To this end, pipe 44 has an internal diameter slightly larger than the outside diameter of exhaust pipe 40, which exhaust pipe customarily has an outside diameter between about 1¼ inches and 2 inches. Clamps 52 are cooperatively sized to the outside diameter of exhaust pipe 40 and are tightened by means of nuts 60 which urge U-shaped member 54 and yoke 56 into gripping engagement with notched pipe ends 66 and mashes them into substantially sealed attachment to right and left segments 62 and 64.

As shown in FIG. 3, jacket 48 of heat exchanger 42 is provided with an inlet port 68 and an outlet port 70 shown in the form of tapped inlet aperture 72 and tapped outlet aperture 74, respectively. Tapped inlet aperture 72 and tapped outlet aperture 74 are shown on opposite sides of jacket 48 and are each fitted with compression fittings 76, best seen in FIG. 8.

Compression fittings 76 are of a known type including a body 78, a lead sleeve 80 and a nut 82. Body 78 is externally threaded at opposite ends and adapted to be threadedly received in tapped inlet aperture 72 or tapped outlet aperture 74. Body 78 also includes a flange 84 which is wrench gripable.

With one end of compression fitting body 78 screwed into tapped inlet aperture 72, for example, sleeve 80 and nut 82 are slipped on the end of tubing 86 to be joined to fitting 76. Nut 82 is then threaded on the other end of body 78 and tightened so that tubing 86 is slightly pinched and sleeve 80 forms a high-pressure seal between tube 86 and body 78. Similarly tube 88 is joined to tapped outlet aperture 74.

Tube 86, which is flowably connected at one end to inlet port 68 of heat exchanger 42 as above described, is flowably connected at the other end to air cleaner 12 by means of a compression fitting 90 which is similar to fitting 76. Tube 88, which is flowably connected at one end to outlet port 70, is selectively flowably connected at the other to intake manifold inlets 24 by means of a check valve 92 as more particularly described below.

Check valve 92 is inserted in tube 88 between outlet port 70 and intake manifold inlets 24 and includes threaded apertures 94 and 96 for joining first and second tube sections 98 and 100, respectively, by compression fittings (not shown) like fittings 76. Check valve 92 further includes a ball 102 which is cooperatively received in a valve seat 104 and gravity held therein when the valve is closed. When the valve is opened by suction created by the pistons, ball 102 is received in a recess 106 in a plate 108 while air is drawn through slots 110 in plate 108.

As seen in FIGS. 1 and 6 tube section 100 joins a T-shaped fitting 112, the arms of which are flowably connected with tubes 114 and 116 to intake manifold inlets 24.

Tube 86 as shown has an inside diameter of three-eighths in., tube sections 98 and 100 have an inside diameter of three-eighths in. and tubes 114 and 116 have an inside diameter of five-sixteenths in.

A tapped hole 118, five-sixteenths in. in inside diameter, is bored as shown in FIGS. 6 and 7 into each primary manifold inlet 28 in such a way that the manifold heating channels are avoided and the manifold left substantially unweakened. Each hole 118 is provided with a compression fitting 120 similar to fittings 76. Fittings 120 are then used to flowably connect tubes 114 and 116 to intake manifold 16.

In use, the present fuel vaporizer does not interfere with the conventional fuel enrichment system when the carburetor vacuum drops below a selected point, such as below about 12 in. Hg. This will generally be the case when maximum power for quick acceleration and to negotiate grades is needed or when the engine is cold during startup. In those cases, the fuel vaporizer of this invention is automatically disengaged since there will be insufficient suction applied through tubes 114, 116 and thence to tube 100 to unseat ball 102 in check valve 92.

When the carburetor vacuum rises above a certain level on acceleration, check valve 92 will be unseated and air will be drawn into primary manifold inlets 28. By this time even if the engine is just being started, the hot exhaust gases passing through pipe 44 in heat exchanger 42 will heat the clean, filtered air in jacket 48 so that the air drawn into intake manifold 16 will be heated.

As the vacuum continues to increase until it is at its operational maximum (generally between about 15 in. Hg and 22 in. Hg), the amount of heated air sucked into intake manifold 16 will increase. As the heated air enters intake manifold chamber 36 it will tend to vaporize or revaporize the air/fuel combustion mixture so that it will be more completely burned in the cylinders. In addition to vaporizing the carbureted mixture, the addition of air thins the mixture so that less of the fuel is wasted by incomplete combustion. Engine efficiency is thereby enhanced and pollutants reduced.

In addition to improving carburetion, the present fuel vaporizer, as will be readily appreciated, is relatively inexpensive to construct and may be readily installed as original equipment or added to existing engines.

An added advantage of the present device is that it provides substantially no heat after engine shutdown to either the intake manifold or to the carburetor. Thus, it does not contribute to vapor lock or like problems.

In other variations, more heated air can be forced into the primary manifold inlets 28 by an auxiliary pump such as a smog control pump (not shown). This pump may be inserted in the system, for example, as in tube 86 leading to heat exchanger 42.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. In an internal combustion engine having an air cleaner mounted on a carburetor having primary and secondary outlets, an intake manifold having primary and secondary inlets and an exhaust manifold, the improvement comprising a heat exchanger in heat exchange relationship with the exhaust system, a sealed first passageway flowably connected to said air cleaner before said air cleaner vents into the carburetor and a second sealed passageway flowably passing heated air from said heat exchanger through a port in the primary manifold inlet, said manifold having a web separating the primary and secondary inlets and extending partially into said manifold, said port in the primary manifold inlet located adjacent the primary carburetor outlet whereby the heated air mixes with the air/fuel mixture passing through the primary manifold inlet before said air/fuel mixture mixes with the air/fuel mixture passing through the secondary manifold inlet.

2. The internal combustion engine according to claim 1 wherein the carburetor has two primary and two secondary outlets and the intake manifold has two primary and two secondary inlets, the ports in said primary manifold inlets being substantially opposed.

3. The internal combustion engine according to claim 2 which further includes a check valve in said second sealed passageway, said check valve selectively opening and closing in response to carburetor vacuum.

4. The internal combustion engine according to claim 3 wherein the check valve remains closed when the vacuum pressure in the carburetor falls below about 12 in. Hg.

5. The internal combustion engine according to claim 4 wherein the check valve includes a ball and a valve seat, said ball adapted to be received in said valve seat when the valve is closed, said check valve further including a recess in a slotted plate, said ball adapted to be received in said slotted plate when the valve is open.

6. In an internal combustion engine having an air cleaner mounted on a carburetor having primary and secondary outlets, an intake manifold having primary and secondary inlets and an exhaust manifold, the improvement comprising a heat exchanger having an inner tube and an outer tube annularly spaced therefrom and sealed at its opposite ends to said inner tube, said inner tube interposed at its opposite ends in the exhaust system, said outer tube having an inlet and an outlet, a first tube having first and second ends sealed at said first end to a sidewall of the air cleaner and at said second end to the inlet in said outer tube, and a second tube having first and second ends sealed at said first end to the outlet in said outer tube and at said second end to a port in the primary manifold inlet, said manifold having a web separating the primary and secondary inlets and extending partially into said manifold, said port in the primary manifold inlet located adjacent the primary carburetor outlet whereby the heated air passing through the port mixes with the air/fuel mixture passing through the primary manifold inlet before said air/fuel mixture mixes with the air/fuel mixture passing through the secondary manifold inlet.

7. The internal combustion engine according to claim 6 which further includes a check valve interposed in said second tube between the outlet in said outer tube and the port in the primary manifold inlet, said check valve adapted to remain closed when the vacuum pressure in the carburetor falls below about 12 in. Hg.

8. The internal combustion engine according to claim 7 wherein the check valve includes a ball adapted to be received in a valve seat and held therein by gravity when the valve is closed, said ball adapted to be unseated by the vacuum pressure in the carburetor when the pressure is over about 15 in. Hg. when the valve is open, and said ball adapted to be received in a recess when the ball is unseated, said recess adapted to redirect the ball into its valve seat when the carburetor pressure falls.

9. The internal combustion engine according to claim 8 wherein the connections between the first tube and the air cleaner and the inlet in the outer tube and the connectors between the second tube and the outlet in the outer tube, the check valve and the port in the primary manifold inlet are by compression fittings.

10. The internal combustion engine according to claim 9 wherein said heat exchanger is interposed in an exhaust pipe portion of the exhaust system and wherein the inner tube of the heat exchanger has notched ends and an inside diameter large enough to slippingly receive exhaust pipe segments and be clamped thereto.

* * * * *